April 2, 1946. H. J. LONGLEY 2,397,798
MACHINE TOOL FOR METAL TURNING AND THE LIKE
Filed Sept. 9, 1942 3 Sheets-Sheet 1

Inventor:
H. J. Longley
By E. F. Wenderoth
Atty

Patented Apr. 2, 1946

2,397,798

UNITED STATES PATENT OFFICE 2,397,798

MACHINE TOOL FOR METAL TURNING AND THE LIKE

Herbert Joseph Longley, Calcutta, British India

Application September 9, 1942, Serial No. 457,772
In British India December 20, 1941

12 Claims. (Cl. 29—27)

This invention relates to a machine tool adapted to take the place of a simple lathe used in workshops for metal turning, machining and cutting off purposes, and has for its object to provide an improved machine for these purposes working in a novel manner.

As usually constructed a lathe consists of a head-stock and a bed which must be carefully machined to insure the accuracy of the lathe. On this bed is mounted a saddle which is adapted to slide thereon and which carries the tools. This saddle can move horizontally parallel to the axis of the lathe, and in addition a transverse slide is mounted on the saddle which moves the tools at right angles to the longitudinal axis of the head-stock in a horizontal plane.

In the improved machine tool according to this invention however there is no bed which has to be faced up accurately, but according to a preferred embodiment of the invention this is replaced by a single straight turned rod, forming a pilot or directing shaft, fixed parallel to the axis of rotation of the work-piece fixed in the machine. There is no saddle or transverse slide as these are no longer necessary in this type of machine as the tool carrying member or members, conveniently in the form of an apron or aprons, is mounted on the said pilot shaft which member can be traversed to move longitudinally along the shaft and can also rotate around or have angular movements about the axis of the shaft. This member or apron (or aprons) carries the cutting tools and the feed to the tools is applied either by moving the tool carrying member or apron longitudinally along the said pilot shaft, or moving it in an angular direction around the said shaft so that the tools move either towards or from the turning axis of the machine or work-piece, preferably in a vertical direction. The longitudinal or traversing movement of the tool carrying member in the direction along and parallel to the said shaft is effected by traversing means mounted on a member adapted to swing with the tool carrying member but incapable of sliding along and parallel to the axis of said pilot or directing shaft relatively to the base of the machine. The angular movement of the tool carrying member is controlled by gravity and a vertical feed screw means for operating with, or associated with, the base of the machine.

The pilot or directing shaft may have substituted therefor equivalent means enabling the tool carrying member or apron to be moved either axially along or to be rotated or moved in the angular direction around a fixed axis, which axis is parallel to but some distance from the turning axis of the machine.

It will thus be seen that one object of the invention is to provide a machine tool in which the member which carries the cutting tools is mounted so as to be capable both of turning around and sliding along (or being fed along) a fixed axis which supports the member and which is parallel to but spaced some distance away from the axis on which the work-piece rotates, and also to provide convenient means whereby these movements may be controlled.

Another object is to support the tool-carrying member, which may be in the form of an apron, at points widely spread or separated along the axis on which it turns and slides. With such wide spreading or separation the said member is given greater solidity and rigidity relatively to its weight and strength, and vibrations of the cutting tools are largely eliminated.

Still a further object is to place the said axis upon which the tool carrying member rotates and slides at a considerable distance from the axis of rotation of the work-piece or the axis of the head-stock, and to support the said member at another point adjacent to the latter axis—but preferably in front of said axis.

The front support is conveniently in the form of a vertical spindle operated by a screw which not only supports the front end of the said member or apron but adjusts and controls the elevation of said front end, and thereby controls the feed and depth of cut given to the cutting tools. This third point of support is not a fixed point of support but is in the nature of support on the top of a vertical feed spindle bearing against a machined path on the tool-carrying member so that the said member can freely slide above and on said spindle.

It will thus be seen that the tool-carrying member has the equivalent of a three-point support which will give it great stability and help to eliminate vibration. One important object thus is to achieve this elimination of vibration by providing three wide-spread points of support. This third point of support is advantageously in the front of the machine and in front of the work-piece to be turned and thus in front of the axis of turning and centre-line of the head-stock in which the work-piece is clamped and rotates. The other points of support, being along the axis about which the tool-carrying member rotates and slides, are at the back of the machine.

Another object of the invention is so to arrange the tool-carrying member that it in its working position lies in approximately a horizontal plane. By so arranging this member its weight can be utilised to cause a tool fixed above the axis of rotation of the work-piece to effect a cut upon the member upon the tool merely being lowered by the operation of the vertical feeding spindle. This enables cutting tools to be mounted upon the tool-carrying member or apron both above and below the axis of rotation of the work-piece, and thus enables more than one cutting tool to be used in sequence, the lower cutting tool being fed upwards by the operation of the said vertical feed spindle, whilst the upper cutting tool is lowered by easing off said spindle and by gravity is forced against the work-piece, the depth of cut taken being however controlled by the movement of the said spindle.

By the mounting of the tool-carrying member or apron in the manner explained a further object is achieved in that the cutting tools may be applied to the work-piece so that their cutting edges are on the vertical plane upon which the turning axis of the work-piece lies. When this is done the cutting tools may be so fixed on the carrying member or apron that bending stresses on the tools themselves may be largely eliminated because the tools may be more securely clamped in position with a practical absence of overhanging cantilever ends subjected to bending. This particularly applies to the tools carried on the apron itself below the work-piece which tools can, as will hereafter be explained, be solidly supported.

Another main object of the invention is to provide a construction according to which the tool-carrying member or apron can be fed or moved longitudinally along the axis about which it rotates and slides so that the cutting tools carried thereby can be caused to perform the necessary turning operations. With this object in view the "horizontal" feeding of the tool carrying member in a direction parallel to the turning axis of the work-piece and head-stock (and of the parallel turning and sliding axis of the said member itself) is effected by a feeding mechanism carried upon a bracket, or its equivalent, which can itself turn on the same axis as that upon which the said tool-carrying member turns and slides. The said bracket although turning on the same axis is so mounted that it cannot itself slide along this axis, but only causes the tool-carrying member to slide therealong.

A further object of the invention is to provide a very robust and stiff machine which is capable of performing certain turning and machining operations very efficiently and with an absence of vibration, whilst at the same time the machine itself is very cheap to manufacture and requires in its fabrication the minimum of machining. It is indeed hoped to be able to make a satisfactory machine which will cost considerably less than the cost of an ordinary lathe and very much less than the cost of a turret lathe.

The invention will now be described with reference to the accompanying drawings, in which.

Figure 1:
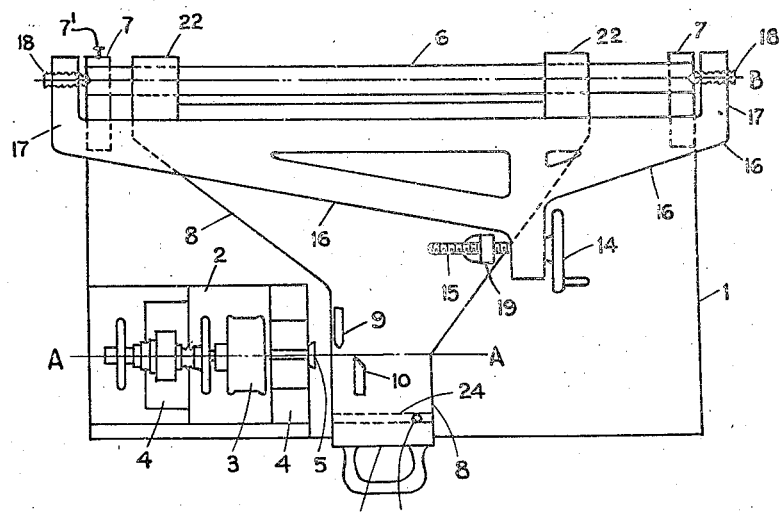
Fig. 1 is a plan of a form the machine may take.
Figure 2:
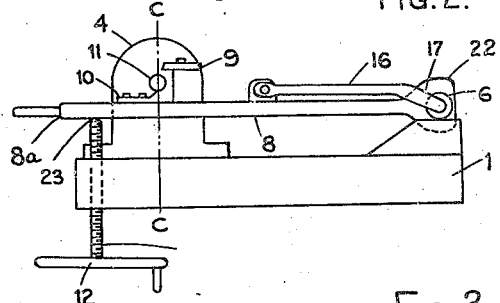
Fig. 2 is a side view of the machine with parts omitted.

Referring first to Figs. 1 and 2 the machine tool consists of a base 1 on which is mounted a head-stock 2. This head-stock comprises a driving pulley 3, bearings 4, 4 and a collet or chuck 5 for holding the work in the machine. The turning axis of the machine viz., the longitudinal axis through the head-stock 2 and the work-piece which will be fixed therein is shown at A—A.

At the back of the base 1 is mounted a pilot or directing shaft 6, the axis B—B of which is fixed relatively to the axis A—A and is thus parallel to the centre-line or turning axis of the head-stock 2. This axis B—B forms the datum line controlling the direction of movement of the cutting tools. The shaft 6 is mounted in bearings 7, 7 and may either be fixed or may revolve therein. In many cases it will be better to make the said pilot or controlling shaft fixed, as for example by the set screw 7'. On this pilot or controlling shaft 6 is mounted a tool carrying member 8 which can move both in the angular direction around and longitudinally along the axis B—B, which is the axis of the pilot or controlling shaft 6.

This tool carrying member 8 may be in the form of an apron, for example as shown, and may roughly be of a triangular shape in plan. The tool carrying member 8 carries cutting tools 9 and 10 fixed in any convenient types of holders. One of these tools 10, is mounted under the work-piece, and the other 9 above the work-piece, as more clearly indicated in the enlarged sectional view shown in Fig. 4. It will be seen that the cutting edges of these tools are approximately upon a vertical plane C—C passing through the centre-line of the head-stock, that is to say are upon the vertical plane upon which the line A—A lies.

The movement of the tool carrying member 8 in an angular direction around the shaft 6 would then cause either the tool 9 or the tool 10 to engage with the work-piece 11 (see Fig. 4) to be turned. The angular movement of the tool carrying member 8 is controlled by the hand-wheel 12 which is fixed to a screwed shaft 13 passing through the base 1. The tool carrying member 8 rests upon the top of this screwed shaft 13 by gravity, so that rotation of the hand-wheel 12 raises or lowers the front end 8a of the tool carrying member, causing a corresponding movement of the cutting tool.

In addition to this angular movement of the tool carrying member 8, the member can also be moved longitudinally by sliding axially along the axis B—B of the shaft 6, being moved by means of the hand-wheel 14 which is secured to a screwed shaft 15 carried by a member or bracket 16 which is pivoted to swing about the axis B—B of the shaft 6. In the embodiment shown in Fig. 1 the bracket or member 16 is provided with end lugs, 17, 17, into which pivot pins 18, 18, are screwed and fixed. These pivot pins have coned ends which enter axial recesses on the centre-line of the shaft 6, so that this member 16 swings about the same axis B—B as does the tool carrying member 8. In this particular instance, the shaft 6 is so fixed in its bearings or mountings 7, 7, that it cannot move longitudinally, and hence although the member 16 can swing about the axis B—B it cannot move longitudinally along such axis. It is thus fixed from longitudinal (axial movement) and can therefore impart such movement to the member 8 upon rotation of the hand-wheel 14.

The screw 15 passes through the boss 19 which is fixed to the tool carrying member 8 and hence the rotation of the hand-wheel 14 causes the cutting tools 9 and 10 to move axially, viz., parallel to axes A—A and B—B and one or other of these tools, when engaged with the work-piece, will thus make the necessary cut or will machine or turn the work-piece.

Figure 4:
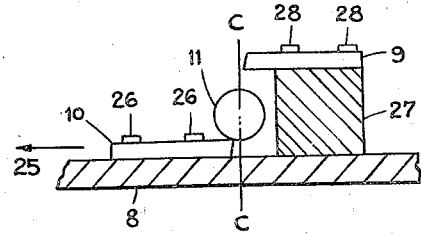
Fig. 4 is a sectional diagram to a larger scale of the tool holders and tools carried at the end of a tool carrying member.

In Fig. 4 it will be seen that the lower tool 10 is shown as engaged with the work-piece, and when the member 8 upon which it is mounted is moved axially, in the manner above indicated, the work-piece will be turned by such tool.

Figure 3:
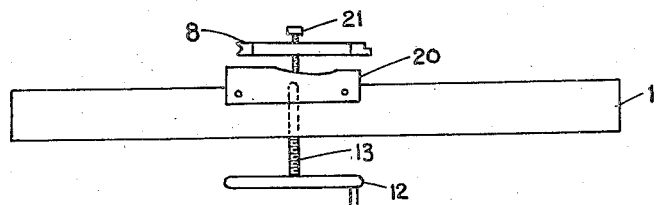
Fig. 3 is a diagrammatic indication of how a former may be used with this machine.

Referring now to Fig. 3 the machine tool may also be used for copying intricate patterns. This can be done by replacing the spindle 13 of the wheel 12 by a template or former 20. A pointer 21 may be fitted to the tool carrying member 8 and rests upon the former 20. When longitudinally (i.e. axial) motion is imparted to the tool carrying member, the front end 8a of the said member is raised and lowered according to the shape of the former as the member 8 is being moved axially, so that the cutting tool moves similarly and turns the work-piece to the shape required.

Referring once again to the tool carrying member 8 of Figs. 1 and 2, it should be noted that this member pivots on the shaft and is supported by the bearings in the projections 22, 22, in such manner that the member may be moved angularly around the pilot or controlling shaft 6 or may slide along this shaft. This shaft 6 is a long shaft, for example, it may be the full length of the machine, whereas it is intended that the axial movement along this shaft of the tool carrying member will generally be small. The distance apart of the bearings 22, 22, is therefore unusually large, relatively to the required axial movement of the tool carrying member and this distance, centre to centre of the bearings 22, 22, may conveniently be four, five or more than five times the axial distance through which the member 8 is intended to move. This wide spacing of the bearings 22, 22, gives exceptional stiffness and stability to the member 8 and helps to check vibrations of the cutting tools carried thereby.

It will further be observed from Fig. 1 that the tool carrying member or apron 8 is roughly triangular in shape and moreover has a point of support at the front end above the screw 13. This point is indicated at 23 in Fig. 2. This is not a fixed point with reference to the member or apron 8, as the member or apron 8 slides upon and is supported by this screwed shaft 13. The lower side of the member or apron 8 may be machined along the line along which the member slides above the screwed shaft 13. This line is shown dotted at 24 in Fig. 1. In any case it will be seen that the point of support at the front end of the member 8a is at some point along this line 24. At the same time the member 8 is also supported at its two bearings at 22, 22, and hence there is a three-point support of this tool carrying member, which method of support helps to avoid vibration in the member as there is elimination of uncertainty in the manner of and points of support. The member 8 is therefore one which is adapted to carry its cutting tools with an elimination of all avoidable vibration.

It will be seen that the back end of the member 8 which slides upon the shaft 6 is of considerable width, when compared with that of an ordinary saddle or cross slide of a lathe, and hence the effect of wear is greatly reduced.

Referring now to Fig. 4 it will be seen that an important advantage possessed by this new form of machine tool is that it permits the cutting tools to be mounted so that the length of the tool is tangential to the work-piece, and hence the thrust on the tool is in line with the length of the tool. For example, in Fig. 4 it will be noted that the work-piece is in contact with the lower tool 10. The work-piece is, in this figure, rotating clockwise and is being turned. The top of the tool and length of the tool is tangential to the cylindrical cut being made, and the thrust on the tool is mainly in the direction of the arrow 25. This tool 10 is clamped down to the upper surface of the tool carrying member 8 by use of the fastenings 26, 26, and the tool is most firmly and solidly supported from underneath, so that there can be little or no bending moment on the tool, or if there is any bending moment due to a slight lateral thrust on the tool this is very small when compared with the bending moment which is applied to ordinary tools when fixed to the saddle of a lathe.

The tool 10 which is the lower tool of Fig. 4 is brought into contact with the work-piece by raising the front end 8a of the tool supporting member 8, and the desired cut can be adjusted by the operation of the hand-wheel 12 when a cylindrical cut is being made i.e. when the work-piece is being turned. After the desired machining operation is made with tool 10, a further machining operation may be made with the upper tool 9 which is mounted and clamped to the tool holder 27 by means of the clamping means 28, 28. In this case the tool is brought into operation by lowering the front end of member 8 by a desired amount by the operation once again of the hand-wheel 12. The member 8 is lowered owing to gravity and the weight of the tool supporting member 8, or of the feeding member 16, or of both combined may be such that the tool 9 when lowered by the operation of hand-wheel 12 is itself sufficiently weighted or loaded to effect a cut of any desired depth.

It will be noticed only one or other of the tools, 10 or 9, will operate for machining the work-piece at any one time.

As the cutting edges of the tools 10 and 9 are practically upon the vertical plane C—C passing through the centre-line of the work-piece 11, when a transverse cut is applied (as when parting of the bar) the force applied to the tool is in a horizontal direction at right angles to the work-piece or bar to be parted, and is along the length of the tool. It will readily be realised that this force is transmitted in a much more direct manner than that applied to a tool which projects through the transverse slide and saddle on the bed of an ordinary standard lathe. There is thus no vertical bending of the lower tool and only a small amount of bending on the upper tool, and it is found this method of mounting the tools eliminates spring in the tool and consequently there is no chatter. This results in smooth work and longevity of the cutting edge of the tool.

It should further be noted that the turning axis A—A of the machine and the axis B—B upon which the tool carrying member slides and swings are parallel to each other. Moreover in the embodiments shown these two axes lie approximately upon the same horizontal plane. Further, there is a considerable distance horizontally between these two axes A—A and B—B When therefore the tool carrying member 8 is moved angularly around the axis upon which it is mounted, or around the pilot and controlling shaft 6, the cutting edges of the two tools 9 and 10 move either up or down almost on the vertical plane C—C through the turning axis of the work-piece.

Figure 5:
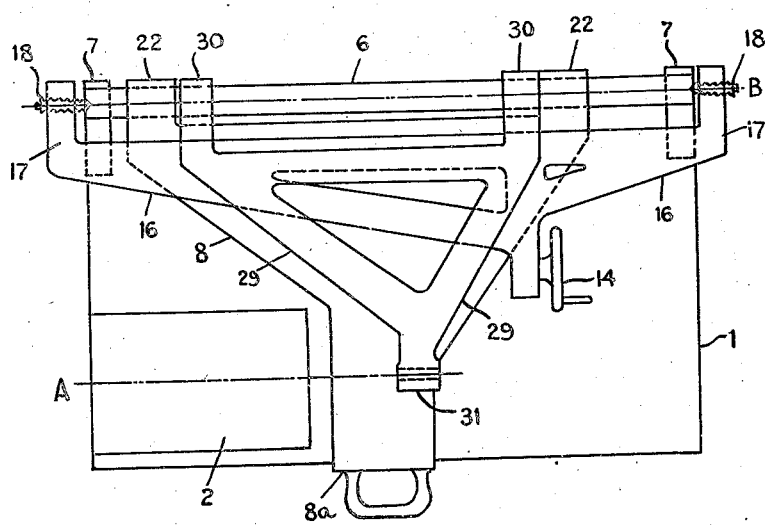
Fig. 5 is a view of a modification of the machine, shown in plan, in which two tool carrying members are indicated instead of one.
Figure 6:
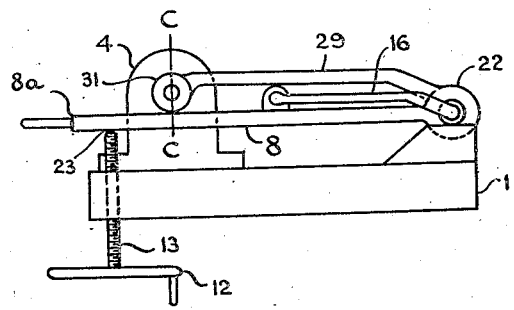
Fig. 6 is a side view of this with parts omitted.

Turning now to Figs. 5 and 6, a modification of the machine is shown in which a second tool carrying member or apron 29 is provided. This tool carrying member 29 is provided in the illustration with bearings 30, 30, so that it also may turn about the shaft 6. As these bearings 30, 30, are a close fit to, and adjacent to, the bearings 22, 22 of the tool carrying member 8, the two members 8 and 29 must travel together in the longitudinal or axial direction as they are caused to slide together along the shaft 6. However the upper member 29 may, if so desired, be swung up and out of use quite separately from the lower member 8, when it is no longer required. The front end 31 of this member 29 rests upon the upper surface of the member 8 and need not necessarily be fixed thereto. This end 31 may carry a tool, for example, it might carry a twist drill in a tail-stock, or any other tool which it is desired to use. If a twist drill or boring tool is fixed to 31, this may be aligned with the turning axis A—A of the machine to make an axial bore in the work-piece. However one is not limited in any way to the fixing of a particular type of tool in part 31, but various cutting tools, one or more in number, might be fitted. When no longer required the front end of the second member 29 may be lifted and swung right over the shaft 6, so as to hang from the shaft at the back of the machine, and whilst the machine is being used, operating tools carried by the tool carrying member 8, this member 29 then does no work but will merely slide back and forward with the member 8 as that member is moved axially along the shaft.

Figure 7:
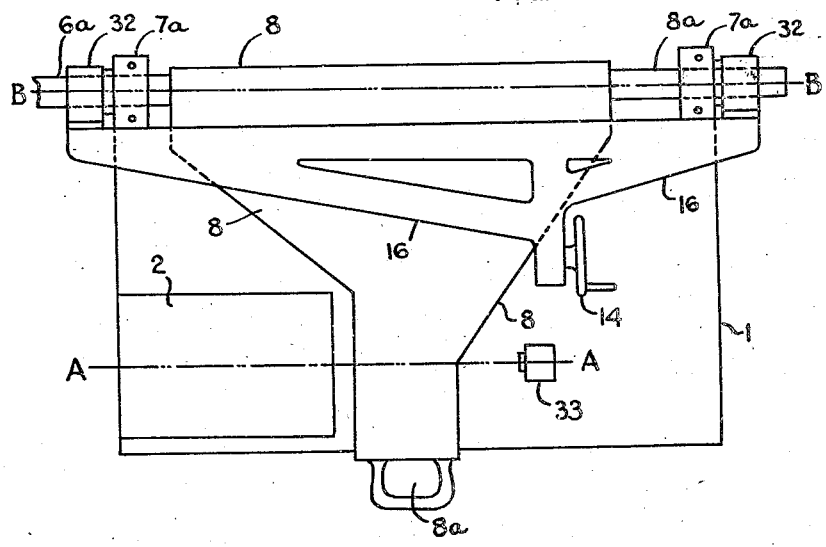
Fig. 7 is an alternative view to Fig. 1 showing a plan of the machine in which the method of mounting the tool carrying member and the feeding member are somewhat different.
Figure 8:
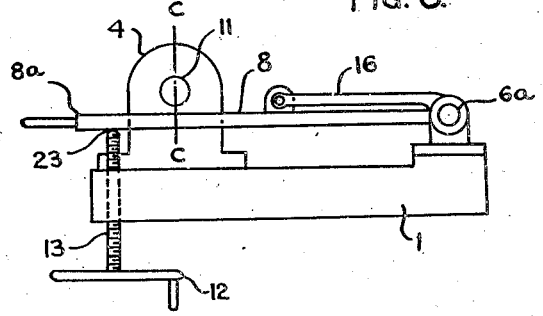
Fig. 8 is a side elevation of this machine with parts omitted.

Turning now to Figs. 7 and 8 another embodiment of the machine is shown in which the pilot and control shaft 6 has substituted therefor elongated trunnion pins 6a. These trunnion pins are fixed to the tool carrying member 8. They pass through bearings 7a, 7a which are supported on the base 1 of the machine and they enable the tool carrying member 8 not only to slide in these bearings 7a, 7a, but also to rotate about the axis B—B of these bearings.

The feeding and axial traversing member 16 is also mounted upon these trunnion pins 6a, 6a having bearings 32 which embrace the outward extensions of the pins 6a, 6a. The member or bracket 16 can therefore be rotated in the angular direction around the pins 6a, 6a and thus around the axis B—B, but is so formed that it embraces closely the outer surfaces of the bearings 7a, 7a, which close contact prevents any longitudinal movement of bracket 16 axially along this axis. The machine will otherwise operate exactly in the same manner as described with reference to Figs. 1 and 2 and needs no further description.

It will of course be realised that the scope of the invention is not restricted to the exact embodiments shown, as other constructional details might be used enabling the tool holder to move axially along a fixed axis parallel to and spaced some distance away from the turning axis of the machine.

Although in Figs. 1, 2 and 4 two cutting tools are shown as carried by the tool carrying member 8, it will be obvious that less or more tools might be carried by such member, and one is not limited to the number or type of the tools. It is however desirable that at least one of the tools carried by this member should be below the work-piece so as to be raised against the work-piece, and at least one of the tools should be above the work-piece so as to be lowered into contact with the work-piece.

The number of tools to be used will of course be according to the particular job which has to be machined.

Although a tail-stock has been indicated as being carried by the second tool supporting member illustrated in Figs. 5 and 6, it would of course be possible to provide a tail-stock fixed to the base 1, as indicated at 33 in Fig. 7.

Although the pilot and controlling shaft 6 shown in Figs. 1, 2, 5 and 6 may be, and most conveniently is, a simple turned shaft fixed in the bearings 7, 7, and supported from the base of the machine, it will be realised that with suitable modifications the shaft may be allowed to rotate in its bearings. If the shaft rotates it is not essential that the shaft should be circular in cross section in those parts, upon which the tool carrying member slides. This shaft may for this length be a square shaft, or a hexagonal or polygonal section shaft but be so mounted that it will itself rotate about the axis B—B, when such is necessary, for the tool carrying member to be moved in the angular direction around the axis of the shaft. Although it is convenient if a pilot or directing shaft is used that the feeding and axially traversing member 16 should be mounted on the end of the shaft or extensions of the shaft, this is not essential, as this member might be mounted in any other way so that it may rotate about the same axis.

Although it has been indicated that the weight of the member 8 or 16, or both 8 and 16, may be utilised to cause the upper tools to be applied to the work with sufficient force, it will be understood that such weight need not be depended upon, as spring means might be used, or other loading devices be provided, whereby the necessary force may be applied to cause the upper tools, such as the tool 9, to make a cut of the desired depth. It will further be realised that many further modifications may be made in the machine without departing from the scope of the invention.

Any manner of supporting the members 8 and 16 may be provided so that they will be capable of rotating about an axis B—B.

It is not necessary that the two axes A—A and B—B shall be both on the same horizontal plane; this however has been found to be the best arrangement.

I claim:

1. A machine tool of the nature of a lathe and having the capacity of a simple non-screw-cutting lathe for turning, machining and axial drilling of a work-piece fixed therein, including the combination of a base, a head-stock mounted on said base and in which the work-piece may be turned, a tool-carrying member, a mounting for said tool-carrying member on which said member is mounted for movement both longitudinally along and in an angular direction about a fixed axis parallel to and spaced from the turning axis of said head-stock, and a traversing screw mechanism for effecting said longitudinal movement of said tool-carrying member along said axis, said traversing screw mechanism being carried by a member also mounted to move angularly about said fixed axis but to be fixed against longitudinal movement therealong, said mounting and the member which carries the traversing screw mechanism being arranged in superposed relationship with respect to each other, said tool further comprising bearings on said fixed axis on which said tool-carrying member is mounted, said bearings being spaced apart by a distance at least equal to one half of the total length of the machine.

2. A machine tool of the nature of a lathe and having the capacity of a simple non-screw-cutting lathe for turning, machining and axial drilling of a work-piece fixed therein, including the combination of a base, a head-stock mounted on said base and in which the work-piece may be turned, a tool-carrying member, a mounting for said tool-carrying member on which said member is mounted for movement both longitudinally along and in an angular direction about a fixed axis parallel to and spaced from the turning axis of said head-stock, and a traversing screw mechanism for effecting said longitudinal movement of said tool-carrying member along said fixed axis, said traversing screw mechanism being carried by a member mounted to swing angularly with said tool-carrying member but to be fixed against longitudinal movement therewith, said mounting and the member which carries the traversing screw mechanism being arranged in superposed relationship with respect to each other.

3. A machine tool for effecting machining operations ordinarily performed on a simple lathe, and having a base, a rotatable head-stock mounted upon said base for holding a work-piece to be machined, a pilot shaft also mounted upon said base in fixed parallel relationship to, but spaced away from, the turning axis of said head-stock, a tool-carrying member pivotally mounted on said pilot shaft so as to be capable of being both traversed along said shaft and partly rotated about the axis of said shaft to enable tools carried thereby to perform a desired machining operation on the work-piece, a traversing means for effecting said traversing movement, said traversing means being mounted on a member adapted to swing with said tool-carrying member about the axis of said shaft but fixed against sliding movement along said shaft with said tool-carrying member, said tool-carrying member and the member which carries the traversing means being arranged in superposed relationship with respect to each other.

4. A machine tool for turning, facing up, cutting off and for effecting machining operations ordinarily performed on a simple lathe, and having a base, a head-stock mounted upon said base for holding and rotating a work-piece to be machined, a pilot shaft also mounted on said base in fixed relationship to, but spaced away from, the turning axis of said head-stock, a tool-carrying member pivotally mounted on said pilot shaft so as to be capable of being both traversed along said shaft and partly rotated about the axis of said shaft to enable tools carried thereby to perform a machining operation on the work-piece, a traversing means for effecting said traversing movement, said traversing means being mounted on a member adapted to swing with said tool-carrying member about the axis of said shaft but fixed against sliding movement along said shaft with said tool-carrying member, and additional means for limiting and adjusting the angle of swing of said tool-carrying member about said pilot shaft, said tool-carrying member and the member which carries the traversing means being arranged in superposed relationship with respect to each other.

5. A machine tool according to claim 4, in which said additional means for limiting and adjusting the angle of swing of the tool-carrying member is a screw operated feed means.

6. A machine tool capable of effecting turning and machining operations on a work-piece such as are ordinarily performed upon a simple non-screw-cutting lathe, and comprising a base, a head-stock mounted on said base in which a work-piece may be turned, a tool-carrying member also mounted on said base and adapted to slide longitudinally along and partly to rotate about a fixed axis in bearings carried by said base, said fixed axis being parallel to but spaced from the axis of rotation of the work-piece in the head-stock and being approximately in the horizontal plane thereof, and a traversing mechanism for effecting said longitudinal sliding movements of said tool-carrying member along said fixed axis, said traversing mechanism being carried by a member mounted to move angularly about said fixed axis, but to be fixed against longitudinal movement therealong, and said tool-carrying member having at least two bearing points widely spaced along said fixed axis, having a third point of support adjacent the vertical plane through the turning axis of the head-stock.

7. A machine tool according to claim 6, wherein said third point of support is farther from said fixed axis than is the axis of rotation of said head-stock.

8. A machine tool for effecting on a work-piece turning and machining operations such as are ordinarily performed upon a simple non-screw-cutting lathe, and comprising a base, a head-stock mounted on said base in which the work-piece may be turned, a tool-carrying member also mounted on said base both to slide longitudinally along and partly to rotate about a fixed axis on bearings carried by said base, said fixed axis being parallel to, but spaced from, the axis of rotation of the work-piece in the head-stock, a traversing screw mechanism for effecting said longitudinal sliding movement of said tool-carrying member along said fixed axis, said traversing screw mechanism being carried by a member mounted to swing angularly with said tool-carrying member but to be fixed against longitudinal movement therewith, and additional means for limiting and adjusting the angular position assumed by said tool-carrying member by rotation about said fixed axis and thereby controlling the vertical elevation of a tool carried by said tool-carrying member, said tool carrying member having three points of support, of which two points are on said fixed axis along which it is mounted to slide longitudinally and to turn, and the third point is adjacent the axis of rotation of said head-stock and is carried upon said limiting and adjusting means of said tool-carrying member, said tool-carrying member and the member which carries the traversing screw mechanism being arranged in superposed relationship with respect to each other.

9. A machine tool for effecting turning and machining operations on a work-piece, comprising a base, a head-stock mounted on said base in which the work-piece may be turned, a tool-carrying member also mounted on said base both to slide longitudinally along and partly to rotate about a fixed axis on bearings supported by said base, said axis being fixed parallel to, but spaced from, the axis of rotation of the work-piece in said head-stock, a traversing means for effecting said longitudinal sliding movement of said tool-carrying member along said fixed axis, said traversing means being carried by a member mounted to move angularly about said fixed axis but to be fixed against movement in the longitudinal direction of said axis, said tool-carrying member being provided with two pivot extensions mounted in said bearings, said pivot extensions being mounted to slide longitudinally on said fixed axis in said bearings and to rotate, partly at least, in said bearings, said tool-carrying member and the member which carries the traversing means being arranged in superposed relationship with respect to each other.

10. A machine tool according to claim 6, wherein said tool-carrying member is approximately triangular in shape when viewed in plan and carries tool holders and tools, said tool holders and one support of said tool-carrying member being adjacent one corner point of the triangle and the two bearings upon which said tool-carrying member slides and turns upon its fixed axis being adjacent the two other corner points of the triangle.

11. A machine tool according to claim 4, in which said tool-carrying member has at least two tool holders mounted thereon, and, when said member is in its working position, at least one said tool holder is positioned below the axis of rotation of said head-stock and at least one other tool holder is positioned so as to be above said axis of rotation.

12. A machine tool according to claim 4, having a screw operated vertical feed mechanism with a screwed spindle for supporting said tool-carrying member from said base in the position into which it has been swung about said fixed axis, and a cooperating machined sliding surface along which the point of said spindle is adapted to slide while supporting said tool-carrying member when the latter moves longitudinally relatively to said base.

HERBERT JOSEPH LONGLEY.